US011513495B2

(12) United States Patent
Sadusk et al.

(10) Patent No.: US 11,513,495 B2
(45) Date of Patent: Nov. 29, 2022

(54) BUILDING AND ATTACHING SUPPORT STRUCTURES FOR 3D PRINTING

(71) Applicant: Autodesk, Inc., San Francisco, CA (US)

(72) Inventors: Joseph Isaac Sadusk, San Francisco, CA (US); Gregory Daniel Friedland, San Francisco, CA (US)

(73) Assignee: Autodesk, Inc., San Francisco, CA (US)

( * ) Notice: Subject to any disclaimer, the term of this patent is extended or adjusted under 35 U.S.C. 154(b) by 122 days.

(21) Appl. No.: 17/020,085

(22) Filed: Sep. 14, 2020

(65) Prior Publication Data

US 2020/0409337 A1    Dec. 31, 2020

Related U.S. Application Data (62) Division of application No. 16/016,151, filed on Jun. 22, 2018, now Pat. No. 10,775,770.

(Continued)

(51) Int. Cl.
*G05B 19/4099* (2006.01)
*G06T 17/10* (2006.01)
(Continued)

(52) U.S. Cl.
CPC ........ *G05B 19/4099* (2013.01); *B29C 64/393* (2017.08); *B29C 64/40* (2017.08);
(Continued)

(58) Field of Classification Search
None
See application file for complete search history.

(56) References Cited

U.S. PATENT DOCUMENTS

| 5,595,703 A | 1/1997 | Swaelens et al. |
| 5,943,235 A | 8/1999 | Earl et al. |

(Continued)

FOREIGN PATENT DOCUMENTS

| DE | 195 07 881 A1 | 9/1995 |
| DE | 601 22 219 T2 | 8/2007 |
| EP | 2 198 405 B1 | 3/2011 |

OTHER PUBLICATIONS

Unknown author, "Designing Parts for FDM 3D Printing—3D Hubs," (Mar. 16, 2017) [online] (retrieved from https://www.3dhubs.com/knowledge-base/designing-parts-fdm-3d-printing), 15 pages.

(Continued)

*Primary Examiner* — Jason Lin
(74) *Attorney, Agent, or Firm* — Fish & Richardson P.C.

(57) ABSTRACT

Method(s) include projecting a support toolpath into a current layer of a model, removing any pieces within an expanded version of a current boundary of the model, generating a support toolpath for the current layer, adding a height increase to portion(s) of model toolpath(s) for the higher layer of the model that overlie the support toolpath generated for the current layer, connecting the support toolpath and the projected support toolpath to form a connected support toolpath, overlaying the connected support toolpath with a next boundary of the model in a lower layer of the model, adding a height increase to portion(s) of the connected support toolpath that fall within the next boundary of the model in the lower layer of the model, and repeating the process through layers of the model to form support toolpaths for support walls for the object to be manufactured by the extrusion printer.

20 Claims, 4 Drawing Sheets

Related U.S. Application Data (60) Provisional application No. 62/523,638, filed on Jun. 22, 2017.

(51) Int. Cl.
*H04N 1/00* (2006.01)
*B29C 64/393* (2017.01)
*B33Y 50/02* (2015.01)
*B29C 64/40* (2017.01)
*G06T 19/20* (2011.01)
*B33Y 10/00* (2015.01)
*B29C 64/118* (2017.01)

(52) U.S. Cl.
CPC .............. *B33Y 50/02* (2014.12); *G06T 17/10* (2013.01); *G06T 19/20* (2013.01); *H04N 1/00676* (2013.01); *B29C 64/118* (2017.08); *B33Y 10/00* (2014.12); *G05B 2219/35134* (2013.01); *G05B 2219/49007* (2013.01); *G06T 2219/2021* (2013.01)

(56) References Cited

U.S. PATENT DOCUMENTS

| | | | |
|---|---|---|---|
| 6,193,923 B1 | 2/2001 | Leyden et al. | |
| 6,558,606 B1 | 5/2003 | Kulkarni et al. | |
| 7,084,370 B2 | 8/2006 | Hagemeister et al. | |
| 7,277,835 B2* | 10/2007 | Spitz | G06T 17/10 703/2 |
| 8,818,544 B2* | 8/2014 | Nehme | B29C 64/393 705/400 |
| 10,105,897 B2 | 10/2018 | Weitzel et al. | |
| 10,775,770 B2 | 9/2020 | Sadusk et al. | |
| 2003/0191554 A1* | 10/2003 | Russell | G06T 17/20 700/187 |
| 2004/0015254 A1 | 1/2004 | Vancraen et al. | |
| 2004/0251581 A1 | 12/2004 | Jang et al. | |
| 2005/0131570 A1* | 6/2005 | Jamalabad | B29C 64/118 264/401 |
| 2008/0211124 A1 | 9/2008 | Zagagi et al. | |
| 2009/0072447 A1* | 3/2009 | Hull | B29C 64/40 264/401 |
| 2010/0228369 A1* | 9/2010 | Eggers | B29C 64/386 700/98 |
| 2011/0178621 A1* | 7/2011 | Heide | B29C 64/106 700/98 |
| 2012/0010741 A1 | 1/2012 | Hull et al. | |
| 2014/0300017 A1 | 10/2014 | Wighton et al. | |
| 2014/0316549 A1 | 10/2014 | Zenere | |
| 2014/0371895 A1 | 12/2014 | Sadusk et al. | |
| 2015/0018995 A1 | 1/2015 | Weitzel et al. | |
| 2015/0066178 A1 | 3/2015 | Stava | |
| 2015/0091208 A1 | 4/2015 | Sadusk et al. | |
| 2015/0093588 A1 | 4/2015 | Sadusk et al. | |
| 2015/0151493 A1 | 6/2015 | Schmidt | |
| 2015/0360421 A1 | 12/2015 | Burhop et al. | |
| 2016/0306901 A1 | 10/2016 | Ainsworth et al. | |
| 2017/0336777 A1 | 11/2017 | Koh et al. | |
| 2018/0162058 A1 | 6/2018 | Lefebvre et al. | |
| 2018/0240263 A1 | 8/2018 | Courter et al. | |
| 2018/0373227 A1 | 12/2018 | Sadusk et al. | |

OTHER PUBLICATIONS

Unknown author, "Supports in 3D Printing: A Technology Overview—3D Hubs," (Mar. 16, 2017) [online] (retrieved from https://www.3dhubs.com/knowledge-base/supports-3d-printing-technology-overview) 24 pages.

Unknown author, "Tips for Designing a 3D Printed Part—Innovation Station," (Mar. 16, 2017) [online] (retrieved from https://innovationstation.utexas.edu/tip-design/), 6 pages.

Schmidt and Umetani, "Branching Support Structures for 3D Printing," ACM Siggraph 2014 Studio, Aug. 10, 2014, retrieved on May 13, 2016 [online] (retrieved from http://dl.acm.org/citation.cfm?id=2656293), 1 page.

Vanek et al., "Clever Support: Efficient Support Structure Generation for Digital Fabrication," Eurographics Symposium on Geometry Processing, Aug. 23, 2014, 33(5):117-125.

* cited by examiner

BUILDING AND ATTACHING SUPPORT STRUCTURES FOR 3D PRINTING

CROSS-REFERENCE TO RELATED APPLICATION

This application is a divisional application of U.S. application Ser. No. 16/016,151, entitled "BUILDING AND ATTACHING SUPPORT STRUCTURES FOR 3D PRINTING," filed Jun. 22, 2018, which claims the benefit under 35 U.S.C. § 119(e) of U.S. Provisional Application No. 62/523,638, entitled "BUILDING AND ATTACHING SUPPORT STRUCTURES FOR 3D PRINTING," filed on Jun. 22, 2017. The disclosure of the prior applications are considered part of and are incorporated by reference in the disclosure of this application.

BACKGROUND

This specification relates to additive manufacturing, such as fused filament fabrication (FFF) three dimensional (3D) printing, also known as Fused Deposition Modeling (FDM).

FFF using extruded polymer filament is useful for manufacturing three dimensional objects. Current FFF printing is typically accomplished by forcing a solid plastic feedstock through a heated nozzle. The filament is liquefied before or as it passes through the constriction in the nozzle, and the feed pressure causes a bead of material to be extruded as the nozzle is moved to form a beam of the material that is added, layer by layer, to build the object. 3D models of objects can be designed using computer-aided design (CAD) software and then converted to toolpaths for the nozzle of a 3D extrusion printer, either by the CAD software or separate software, often referred to as a slicer. In addition, various techniques have been employed to define toolpaths for infill material to be 3D printed inside an object to be manufactured by the 3D printer, as well as various techniques for defining toolpaths to create support structures for overhangs of an object to be manufactured by the 3D printer.

SUMMARY

This specification describes technologies relating to computer aided structure creation, such as generation of support paths for use with a 3D extrusion printer that additively manufactures objects defined by three dimensional (3D) models.

In general, one or more aspects of the subject matter described in this specification can be embodied in one or more methods that include obtaining a perimeter of a first slice of a three dimensional (3D) model of a 3D object to be manufactured by a 3D extrusion printer having a 3D print bead width, the perimeter corresponding to a first boundary of the 3D model for the first slice; identifying at least one portion of the perimeter of the first slice that extends a distance beyond a second boundary of the 3D model for a second slice of the 3D model, the second slice being below the first slice, and the distance being greater than a threshold amount defining an unsupported overhang; creating a support path that follows a shape of the at least one portion of the perimeter, wherein the support path has a lateral offset from the at least one portion of the perimeter, the lateral offset being a fraction of the 3D print bead width, and the fraction is a positive number less than one; and adding the support path to toolpaths for the second slice to generate a support wall under an object shell to be 3D printed, using the perimeter of the first slice, when manufacturing the 3D object using the 3D extrusion printer.

The fraction of the 3D print bead width can be a first configurable offset fraction, and creating the support path can include: expanding an outermost perimeter of the first slice by the first configurable offset fraction to form an outermost support path; contracting an innermost perimeter of the first slice by a second configurable offset fraction to form an innermost support path; and removing any portions of the outermost support path and the innermost support path that abut the second boundary for the second slice. In addition, the method can include: checking whether the innermost support path, created from the shape of the at least one portion of the perimeter of the first slice, fully contains an expanded version of the second boundary for the second slice; removing a piece of at least the innermost support path when the innermost support path fully contains the expanded version of the second boundary; and removing any portions of the support paths that overlap with the second boundary when the innermost support path does not fully contain the expanded version of the second boundary.

The method can include adjusting a height of the at least one portion of the perimeter of the first slice upward from a specified height of the first slice. Adjusting the height of the at least one portion of the perimeter of the first slice can include: cutting out the at least one portion of the perimeter from the perimeter of the first slice; changing a beginning of the cutout portion of the perimeter to make a diagonal upward move above the specified height of the first slice; changing an ending of the cutout portion of the perimeter to make a diagonal downward move back to the specified height of the first slice; and rejoining the cutout portion to perimeter of the first slice.

The method can include: creating an infill toolpath for the at least one portion of the perimeter of the first slice, wherein the infill toolpath uses bridging between anchor points including anchors to a support wall to be 3D printed using the innermost support path;

identifying locations along the infill toolpath that are farther from an anchor point than a maximum bridge distance; and joining the identified locations to create an infill support path, for the second slice, under the infill toolpath of the first slice. In addition, the can include: adjusting, upward by a first configurable amount, a height of one or more toolpaths, including the infill toolpath, that extend the distance beyond the second boundary of the 3D model for the second slice of the 3D model; and adjusting, downward by a second configurable amount, a height of the infill toolpath at the anchor points.

In addition, the method of can include: projecting one or more support paths created for the first slice into the second slice; removing one or more portions of the projected one or more support paths that overlap or abut the second boundary for the second slice; and connecting support paths created for, and projected into, the second slice. Further, the method can include adjusting upward a height of any portions of the connected support paths for the second slice that fall within a third boundary of the 3D model for a third slice of the 3D model.

According to another aspect, a non-transitory computer-readable medium can encode instructions of a program operable to cause data processing apparatus to perform operations including: projecting a previous-layer support toolpath from a higher layer of a three dimensional (3D) model of a 3D object to be manufactured by a 3D extrusion printer into a current layer of the 3D model; removing any pieces of the projected previous-layer support toolpath that are within an expanded version of a current boundary of the 3D model in the current layer to create a projected current-layer support toolpath for the current layer; generating a new support toolpath for the current layer in accordance with the expanded version of the current boundary and a previous boundary of the 3D model in the higher layer; adding a predefined increase in height to one or more portions of one or more model toolpaths for the higher layer of the 3D model, where the one or more portions of the one or more model toolpaths overlie the new support toolpath generated for the current layer; connecting the new support toolpath and the projected current-layer support toolpath, without crossing the expanded version of the current boundary, to form a connected support toolpath; overlaying the connected support toolpath with a next boundary of the 3D model in a lower layer of the 3D model; adding a predefined increase in height to one or more portions of the connected support toolpath that falls within the next boundary of the 3D model in the lower layer of the 3D model; and repeating the operations through multiple layers of the 3D model to form support toolpaths for support walls for the 3D object to be manufactured by the 3D extrusion printer.

Generating the new support toolpath for the current layer can include: expanding a perimeter for the previous boundary by a fraction of a 3D print bead width for the 3D extrusion printer, the fraction being a positive number less than one; identifying at least one portion of the expanded perimeter that falls outside the expanded version of the current boundary; and using the at least one portion of the expanded perimeter to form the new support toolpath for the current layer. The fraction of the 3D print bead width can be a first configurable offset fraction, and generating the new support toolpath for the current layer can include: contracting an innermost perimeter for the previous boundary by a second configurable offset fraction; identifying at least one portion of the contracted perimeter that falls outside the expanded version of the current boundary; and using the at least one portion of the contracted perimeter, in addition to the at least one portion of the expanded perimeter, to form the new support toolpath for the current layer.

The operations can also include: creating an infill toolpath for the higher layer for an overhang portion of the 3D model inside the one or more portions of the one or more model toolpaths that overlie the new support toolpath, wherein the infill toolpath uses bridging between anchor points including anchors to a support wall to be 3D printed using an innermost part of the new support toolpath for the current layer; identifying locations along the infill toolpath that are farther from an anchor point than a maximum bridge distance; and joining the identified locations to create an infill support path, for the current layer, under the infill toolpath for the higher layer. Moreover, adding the predefined increase in height can include adding a first configurable height amount to the infill toolpath for the overhang portion in addition to the one or more portions of the one or more model toolpaths, and the operations can include subtracting a second configurable height amount from the infill toolpath at the anchor points.

According to another aspect, a system includes: one or more computer storage media having instructions stored thereon; and one or more data processing apparatus configured to execute the instructions to perform operations including any of the operations or method described herein. Further, the system can include the 3D extrusion printer, and the operations can include directing the 3D extrusion printer using the toolpaths generated for the 3D model to manufacture the 3D object.

Particular embodiments of the subject matter described in this specification can be implemented to realize one or more of the following advantages. Support structures for an FFF built object can be designed so as to cleanly separate from the object after 3D printing, which can result in better surface quality of a supported portion of a manufactured object after removal of the support structure. FFF bridging techniques can be used above the support structures to reduce the number of contact points between the first layer of an overhang and the underlying support structure, thus facilitating clean removal of the support structure. The support structures can be continuous single filament walls, which simplifies removal of the support structure after FFF 3D printing. In some cases, the support structures can be readily peeled off the 3D printed object like one would pull off tape that is only partially attached to the object.

Further, support walls can be constructed using offsets from perimeters for the object being manufactured, which can reduce the force needed to remove the support wall after 3D printing, and can also provide support for infill material in the first layer of an overhang. Moreover, rather than doing support generation based on analysis of the 3D model, the support generation algorithm can operate using the toolpaths generated by slicing the 3D model for 3D printing. Thus, support walls can be created based on actual object filaments that need to be supported, and so the support walls can be specifically tailored to the kind of filament to be supported, including the shape the filament has. In some cases, the amount of support material used can be significantly reduced, as compared to other support creation approaches, for objects whose shape allows for this.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
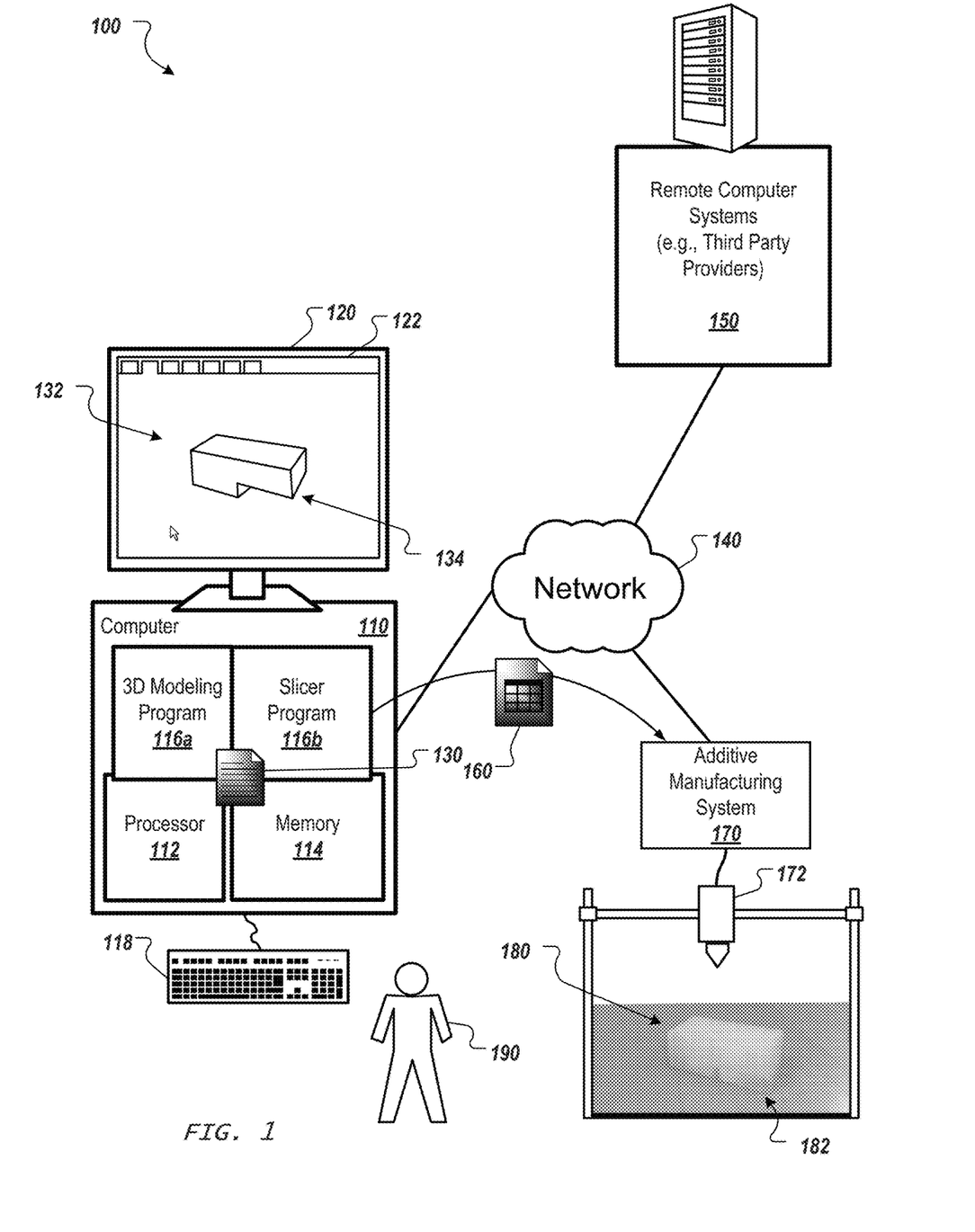
FIG. 1 is a block diagram showing an example of a system usable to design and manufacture objects with support walls for object overhangs.

FIG. 1 is a block diagram showing an example of a system 100 usable to design and manufacture objects with support walls for object overhangs. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs can include a 3D modeling program 116a, which can run locally on computer 110, remotely on a computer of one or more remote computer systems 150 (e.g., one or more third party providers' one or more server systems accessible by the computer 110 via the network 140), or both. The 3D modeling program 116a presents a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer, where the one or more input devices 118 can include a touch screen display.

A user 190 can interact with the 3D modeling program 116a to obtain a 3D model 132. This can involve receiving the 3D model 132 from another program or subroutine and/or creating the 3D model 132 (from scratch or by modifying a loaded 3D model) using known graphical user interface tools. The 3D model 132 can be represented in the computer 110 as one or more surface models, such as B-Reps (Boundary Representations) or polygonal meshes, one or more solid models, such as constructive solid geometry or voxels, or a combination of thereof. In the example shown, the 3D model 132 is a simple L shaped piece, with an overhang 134. However, this simple 3D model 132 is used for ease of illustration only, and it will be appreciated that the systems and techniques described herein are applicable to many different shapes of 3D models. In particular, with additive manufacturing systems and techniques, there is opportunity to manufacture objects with very complex structures, which would be difficult to make using traditional manufacturing techniques.

In any case, the model 132 can be stored as a document 130 and/or used to generate another representation of the model, e.g., an STL (STereoLithography) file for additive manufacturing. This can be done upon request by the user 190, or in light of the user's request for another action, such as sending the 3D model 132 to an additive manufacturing (AM) system 170, which can be directly connected to the computer 110, or connected via a network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In the example shown, the computer 110 includes a slicer program 116b, which slices the model 132 into layers and generates a document 160 (of an appropriate format) to send to the AM system 170 to create a complete structure 180 corresponding to the 3D model 132. The AM system 170 includes an extruder 172 and can thus be referred to as a 3D extrusion printer. However, the AM system 170 can also employ one or more other additive manufacturing techniques in addition to extrusion techniques, such as granular techniques (e.g., Selective Laser Sintering (SLS) and Direct Metal Laser Sintering (DMLS)), and liquid resin curing techniques (e.g., Stereolithography), potentially in combination with subtractive or other computer aided manufacturing methods, investment casting, or combinations thereof.

The document 160 includes toolpaths (e.g., G-code) for the extruder 172, where these toolpaths govern the building of the object 180. The slicer program 116b generates these toolpaths from the 3D model 132, and the slicer program can also generate toolpaths that define support structures for the object 180. For example, the overhang 134 cannot be built as shown since the first layer of the overhang 134 will have nothing underneath it to support that layer, without the addition of a support structure. Thus, additional toolpaths (support paths) are created in order to build a support wall 182 when manufacturing the object from bottom to top.

The operations used to create these support paths to build support structures are described in detail below. Further, while these operations can be programmed into the slicer 116b, they can also be programmed into a separate program that interfaces with the slicer program 116b, provided such separate program has access to appropriate internal knowledge of the slicer's operations. Moreover, such programs (including the slicer) can be included within the 3D modelling program 116a on the computer 110, or such programs can reside on one or more other computers, such as in remote computer systems 150.

Figure 2A:
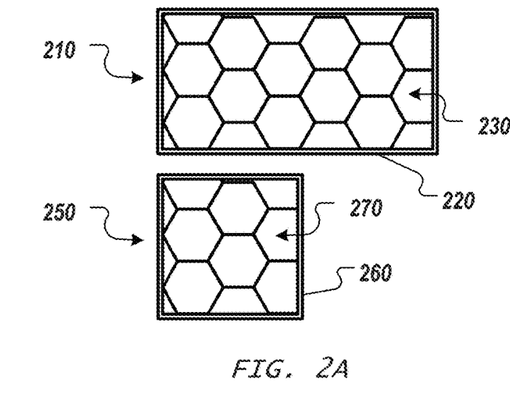
FIGS. 2A-2C are top views showing an example of two layers of an object to be manufactured, including object shells, object infill, and generated support structures.

FIG. 2A is an overhead view (looking down along the Z direction for the 3D printer) of two layers of an object to be manufactured. A first layer 210 includes one or more object shells 220, plus infill 230. As will be appreciated, the infill 230 is not required since the object can be 3D printed as a complete solid (with concentric shells extending from the boundary all the way to the center of the object) but in typical 3D printing, infill is used to speed up the 3D printing process and to reduce the amount of material used. Moreover, while a hexagonal pattern of infill 230 is shown, it will be understood that many patterns of infill (as well as various densities of infill) can be used, and these options are typically under the control of the user.

A second layer 250 lies under the first layer 210. As shown, the object is smaller in the second layer 250 that in the first layer 210. Thus, the first layer 210 has an overhang that needs to be supported. This overhang corresponds to overhang 134 of the object 132 shown in FIG. 1. Further, the second layer 250 includes one or more object shells 260, plus infill 270, similar to the one or more object shells 220, plus infill 230, of the first layer 210. While the number of shells 220, 260 can be as few as one, and in some implementations, as many as five or six shells, in typical 3D printing scenarios, two shells 220, 260 are used in each layer. Note that in FIG. 2A, two shells 220 (and similarly two shells 260) are shown with some spacing between them to make the two shells 220 distinguishable in the figure, but in fact, the two shells abut each other, as shown and described in connection with FIGS. 2D and 2E.

Figure 2B:
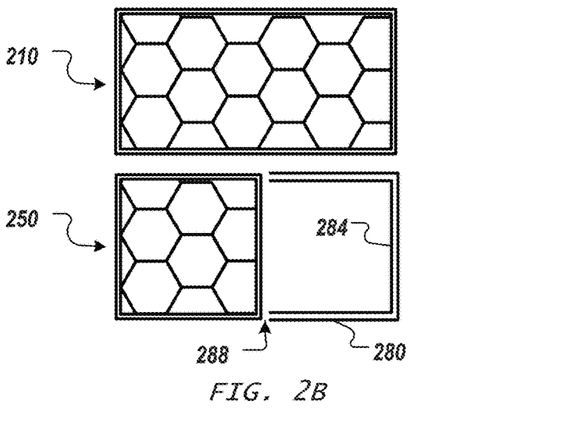

Due to the overhang, a support structure needs to be created. In some implementations, one or more support walls can be manufactured by creating one or more support paths directly from one or more toolpaths for the sliced object. FIG. 2B shows support walls 280, 284 that have been created in the second layer 250 in order to support a portion of the object in the first layer 210. A perimeter (toolpath) for the first layer 210 specifies how the extruder nozzle moves in order to extrude material to build an object shell 220. This perimeter can be positively offset a small amount (e.g., a polygon offset that creates a new polygon that is slightly larger than the polygon of the perimeter) to define the support path used to create an outer support wall 280 for a shell 220. Likewise, this perimeter (or an inner perimeter used to build an inner shell of the object) can be negatively offset a small amount (e.g., a polygon offset that creates a new polygon that is slightly smaller than the polygon of the perimeter) to define the support path used to create an inner support wall 284 for a shell 220.

As will be appreciated, when such offset polygons are created from perimeter(s) for the first layer 210, they may overlap with portions of the object to be 3D printed in the second layer 250. Since the support wall in the second layer should not conflict with the object in the second layer, such overlapping portions should be removed. In some implementations, each offset polygon generated from a first layer 210 to be supported is modified by subtracting from it any portions that fall within an expanded boundary of the object in the second layer 250. Note that expanding the boundary a small amount will cause the resulting support walls 280, 284 to not directly contact the object in the second layer 250, as shown in FIG. 2B. This makes the support structures easier to remove after the 3D printing is completed.

In addition, the amount of the boundary expansion should be less than a maximum bridging distance achievable by the 3D extruder using a particular extruded material. Thus, when the first layer 210 is extruded over the second layer 250, the filament will be able to bridge the gap 288 between the object and the support wall in the second layer 250. Note that a bridge is a straight run of material extrusion that is anchored to underlying material on both ends of the straight run, and provided the run length is not too long, the extruded material is viscous enough that it will not fall down even though there is nothing immediately under it; in fact, as the material cools and solidifies, the material will contract, thereby avoiding or undoing any drooping of the material in the bridge.

Figure 2C:
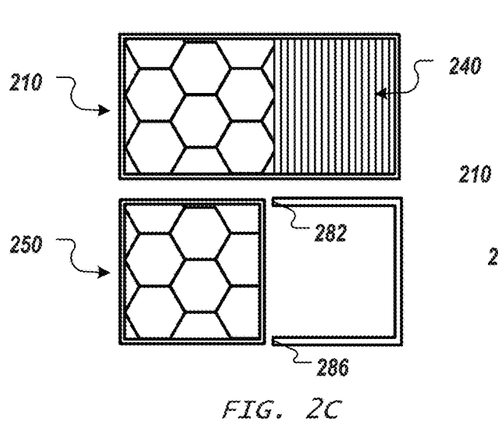

Moreover, as shown in FIG. 2C, concentric support walls can also be connected 282, 286 to form a continuous support wall, which also facilitates removal of the support wall after 3D printing. In the case where the object in the second layer 250 is entirely contained within the boundary of the object in the first layer, the support path created for the support wall in the second layer 250 can be a continuous wall that entirely surrounds the object in the second layer since no portions of this support path need necessarily fall within an expanded boundary of the object for the second layer 250. In such cases, a break can be made in the support wall to create a place to grab the support wall for removal after 3D printing. The size of this break can be the same as the small expansion applied to the boundary, and should likewise be less than the maximum bridging distance. Further, when there are two concentric support walls that are broken in this manner, they can be connected with each other at their two ends, similar to the connections 282, 286 shown in FIG. 2C.

Once a support wall is created for an overhang, the infill should also be addressed. The hexagonal infill 230 shown in FIG. 2A cannot be 3D printed directly over the support wall shown in FIG. 2C. In light of this, new infill 240 is defined for the overhang portion of the first layer 210. This new infill 240 uses bridging techniques to span the distance between different portions of the support wall. In the example shown, the infill bridges 240 anchor at each end to the inner support wall 284, but this is not required. Each infill bridge 240 can have each of its two anchor points be located at the inner support wall or at the object, or have one anchor at the inner support wall and one anchor at the object, depending on the particular shape of the object in the second layer 250 and the orientation of the infill 240 in the first layer 210.

Figure 2D:
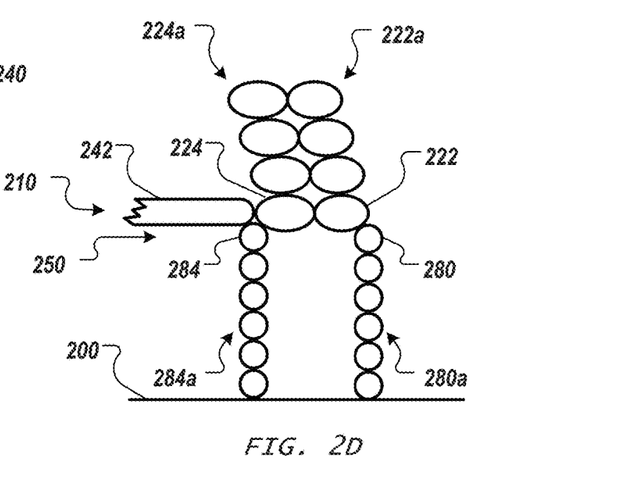
FIGS. 2D and 2E are side views showing details of the object shells and the support structures from FIG. 2C.

FIG. 2D is a side view showing a cross section of the object shells 220 and the support structures 280, 284. In this example, the object shells 220 include an outer shell beam 222 and an inner shell beam 224, each in the first layer 210. The outer shell beam 222 is supported on an outer support wall beam 280 in the second layer 250, and the inner shell beam 224 is supported on an inner support wall beam 284 in the second layer 250. Further, in this example, both the outer and inner support paths have been projected downward without running into the object in lower layers. Thus, the outer support wall beam 280 rests on a series of support wall beams that extend all the way down to a build platform 200, thereby forming an outer support wall 280a, and the inner support wall beam 284 rests on a series of support wall beams that extend all the way down to the build platform 200, thereby forming an inner support wall 284a. Similarly, the outer shell beam 222 supports higher shell beams, forming an outer shell 222a, and the inner shell beam 224 supports higher shell beams, forming an inner shell 224a. Note that in some implementations, the support walls 280a, 284a can rest on a 3D printed raft 200 (see U.S. Patent Pub. No. 2014/0371895, entitled "Raft Techniques in Three-Dimensional Printing", which is hereby incorporated by reference), and in some 3D printing situations, one or more portions of the support walls 280a, 284a (or an entire support wall) can rest on top the object itself in a lower layer. In such cases, a height adjustment can be made to these portions of the support walls to reduce adhesion to the additively manufactured object, as described in further detail below.

Figure 2E:
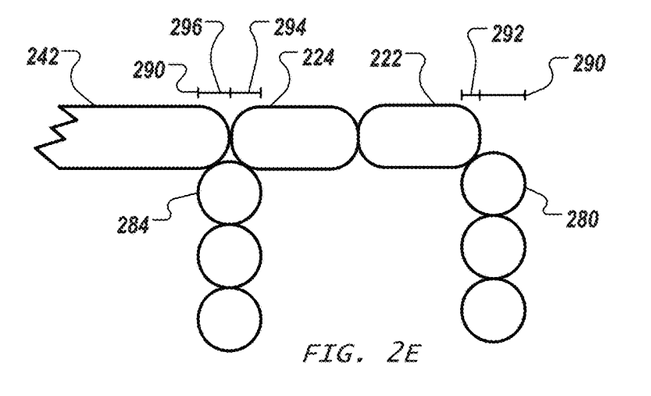

Moreover, as shown, the inner support wall 284a is offset from the inner shell beam 224 toward the center of the object by a small amount such that it can be used to support an infill bridge beam 242 in addition to the inner shell beam 224 of the inner shell 224a. Further, as shown, the outer support wall 280a is offset from the outer shell beam 222 away from the center of the object by a small amount such that it still supports the outer shell beam 222 of the outer shell 222a but is also easy to remove after 3D printing of the entire object. FIG. 2E is a closer view of the same structures shown in FIG. 2D. Note that the cross sectional shapes of the beams of extruded material in these two figures does not exactly match that which will be observed in a 3D printed object, but rather are selected to highlight the features of the respective structures.

Each of the beads 280, 284 is a single bead width extrusion of the FFF material. This can correspond to the minimum extrusion volume, thus forming a thin support wall having a thickness 290 corresponding to the minimum bead size for extrusion. The outer shell beam 222 of the outer shell 222a should be a full thickness shell that follows the outer edge of the object to make sure the outer edge prints cleanly. In contrast, the inner shell beam 224 of the inner shell 224a can be 3D printed with a reduced volume of FFF material since it is not as important to have the inner shell have perfect bonding at every point. In some cases, the inner shell 224a can be half the volume of the outer shell 222a.

The outer beam 280 is offset outward from the center by a fraction of the bead width, and the inner beam 284 is offset inward toward the center by a fraction of the bead width, where these two fractions can be the same or different. In the example shown, the two fractions are different, resulting in an overlap 292 between the support beam 280 and the outer shell beam 222 that is 20% of the bead width 290, and resulting in an overlap 294 between the support beam 284 and the inner shell beam 224 that is 45% of the bead width 290.

Other amounts of overlap are possible. In general, the overlap for the inner support wall 284a should be such that the inner beam 284 can provide a sufficient anchoring point for the infill bridge 242, e.g., the overlap 296 should be at least 40% of the bead width 290. Similarly, the overlap for the outer support wall 280a should be such that the outer beam 280 can still support the outer shell beam 222 while also being easy to remove without causing damage to an exterior surface of the 3D printed object, e.g., the overlap 292 should be at least 8% of the bead width 290 for ABS (Acrylonitrile Butadiene Styrene) material. However, the exact minimum amounts of overlap will vary with the particular extruder conditions (e.g., how hot the machine runs) and filament material being used. Thus, in some implementations, the amount of overlap is a definable parameter that can be set by a user, programmed through an API (Application Program Interface), or both.

Figure 3:
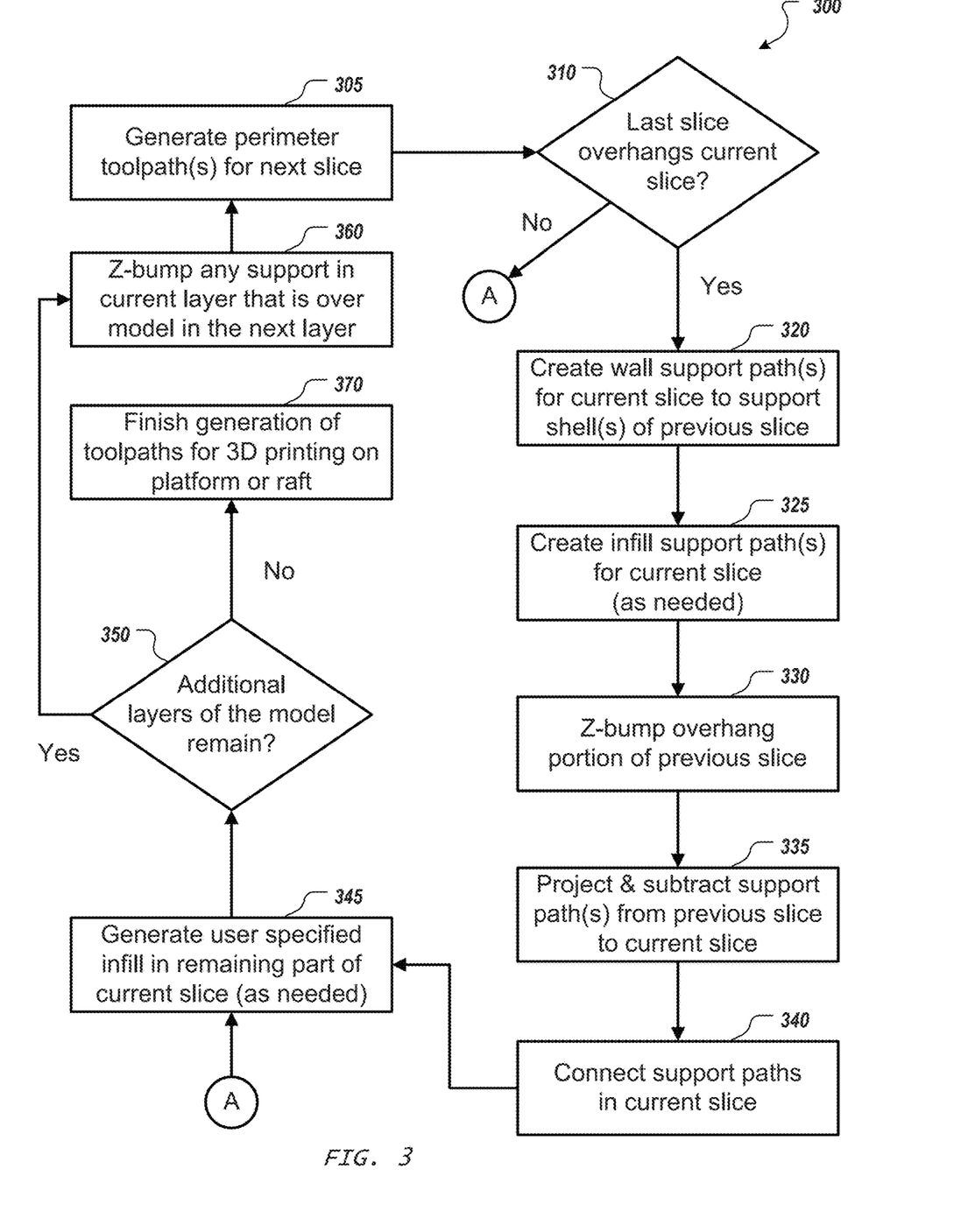
FIG. 3 is a flowchart showing an example of a process to generate toolpaths for support walls for object overhangs.

FIG. 3 is a flowchart showing an example of a process 300 to generate toolpaths for support walls for object overhangs. As part of the model slicing process, one or more perimeter toolpaths are generated 305 for the next slice. In some implementations, the number of perimeters is under user control. The number of perimeters can range from one to six, but will often be only two perimeters, as shown and described in connection with FIGS. 2A-2E.

A check 310 is made to determine whether the last slice overhangs the current slice. If so, toolpaths for shell supports and infill supports are generated. If not, the process 300 proceeds generate 345 regular infill, as needed, within any unfilled portions of the current slice. The regular infill can be in a user selected pattern (e.g., hexagonal, rectilinear or other infill pattern) and have a user selected density (e.g., ranging from 10% to 90% infill density). Various known infill generation algorithms can be used to generate 345 the regular infill.

For a slice that has an overhang from a previous slice, toolpaths for shell supports and infill supports are generated. The check 310 can involve comparing the boundary of the model in the previous slice with the boundary of the model in the current slice. Any place where the previous slice boundary sticks out from the current slice boundary by less than a threshold amount (e.g., overhang distance is less than or equal to 0.8 mm) for the extrusion material to be used with the 3D extrusion printer, then support is not needed since the viscosity and adhesive properties of the extrusion material and the bead thickness will allow the extrusion material to stay in place over such small overhangs. In contrast, any place where the previous slice boundary sticks out from the current slice boundary by more than a threshold amount (e.g., overhang distance is greater than 0.8 mm) for the extrusion material to be used with the 3D extrusion printer, then support is needed.

Note that the reference above to the boundaries need not be explicitly boundaries of the 3D model. Rather the check 310 can involve comparing the outermost perimeter toolpaths generated for the respective layers during slicing of the 3D model. Thus, in contrast with an approach involving checking the 3D model for an angle being exceeded to determine that support is needed, the sliced model itself can be checked to identify filaments of extrusion material (e.g., extruded plastic beams) that will need to be held up during 3D printing.

When an overhang needs a support, one or more wall support paths are created 320 for the current slice to support one or more shells of the previous slice. FFF layers have a series of concentric closed polygons on the outside of the layer, called shells. There are typically at least two shells for every layer, an inner shell defined by an innermost perimeter toolpath and an outer shell defined by an outermost perimeter toolpath. In some implementations, creating 320 the support toolpaths for the shells includes expanding an outermost perimeter of the previous slice by a first offset fraction to form an outermost support path, contracting an innermost perimeter of the previous slice by a second offset fraction to form an innermost support path, and removing any portions of the outermost support path and the innermost support path that abut (or are inside of) the boundary of the model for the current slice.

The support paths thus created follow the shape of the overhang portion of the object in the previous slice, and each of these support paths can define single filament support walls to hold up the outer shell and the inner shell (plus potentially 1-4 intermediate shells). In some implementations, the outer support path for the current layer is offset from the outer perimeter of the previous layer by a first configurable percentage of the filament width, and the inner support path for the current layer is inset from the inner perimeter of the previous layer by a second configurable percentage of the filament width.

The shell is represented as a polygon in each respective layer. Thus, a simple polygon offset can be used to expand the polygon by a small amount, such that the filament of the shell only touches the filament of the support wall by a small percentage of the filament width, thus making is easier to remove the support wall after 3D printing without causing significant damage to the shell. The expansion amount can be configurable, e.g., under user control, since the correct amount will typically vary with what type of extrusion material is being used. For example, for PLA (polylactide) material, the outset amount can be set at 70% of the filament width. Less offset provides more support, and more offset makes the support material easier to peel off, so an optimal amount of offset will typically vary with the extrusion material, and potentially with the 3D extruder. Likewise, a simple polygon offset can be used to contract the polygon such that the innermost filament of the shell only touches the filament of the inner support wall by a percentage of the filament width, thus providing both support to shell and anchoring points for infill to be added to the overhang. The contraction amount can also be configurable, e.g., under user control.

Making support walls one filament thick helps to ensure they stay flexible, and offsetting the support walls from the shell they are supporting reduces the contact patch to the shell, which makes them easier to remove. Shells are supported by a continuous wall to help ensure that every point of the shell is supported and thus keeps the desired shape. The shape of the outermost shell is the primary determining factor for print surface quality, and without all points of a shell anchored to something, details can be lost by the plastic filaments straightening out while they cool. Having shells anchored to something for their entire run help them to retain their shape, but making the anchor weak helps ensure the support structure(s) can be removed without scarring the surface of the 3D printed object.

However, one exception to anchoring is if a toolpath makes a straight run that is anchored on both ends. This is called a bridge. Below a certain distance, the filament will retain its shape without any support to hold it up. This can be exploited with shell supports by dropping the first and last segment of a support wall. This is assuming that for the first unsupported segment of the shell, it will bridge from the layer below to the support structure. Bridging has a distance limit, known as max bridge length, for each respective FFF material (e.g., 8 mm for PLA, and 10 mm for ABS). Note that the max bridge length can depend on the particular extruder conditions (e.g., how hot the machine runs) in addition to the filament material being used. Thus, in some implementations, the max bridge length is a definable parameter that can be set by a user, programmed through an API (Application Program Interface), or both. In any case, if the dropped segment of the support wall is longer than the max bridge length, only a piece of that segment is cut off.

Note that a variation of this strategy is employed if the support wall continues completely around the object. If the support wall is continuous, encircling the object, a small gap is added to aid with removal. This small gap should likewise be less than the maximum bridge distance for the FFF material, such that a perimeter toolpath above this support wall will bridge the gap that is added into the support wall. For example, the maximum bridge distance can be used to create an expanded version of the boundary of the current slice, and this expanded boundary can be compareted to the support path(s) to determine if it fully contains the expanded boundary and thus encircles the object in the current layer. If so, a piece of the support path(s) can be removed, where this piece is smaller than the maximum bridge distance, and if not, any portions of the support path(s) that overlap the expanded boundary can be removed.

When completed, the support paths are assigned to the layer immediately below the layer they are supporting. Thus, the wall support paths are created 320 for the current slice using the perimeter paths of the sliced object generated for the previous slice. In addition, the use of the inner support wall provides anchoring points for not only the inner shell of the object, but also for infill to be created for the overhang.

In some cases, the overhang will be large enough to require support walls for the shells, but small enough that the number of shells will fill in the space of the overhang. However, in many cases, the overhang will be larger than this, and the infill generation should take this into account. Thus, as needed, one or more infill support paths are created 325 for the current slice. This can involve, creating an infill toolpath for the overhang that uses bridging between anchor points on the support wall to be manufactured using the support path created previously at 320.

Infill over an overhang using FFF AM machines will typically be solid fill, straight lines in a raster pattern spaced to completely fill an area. Because they are straight, these toolpaths benefit greatly from bridging. As long as an infill line is anchored at both ends, and supports are spaced no farther than the max bridge distance, they will stay up. The first strategy is to anchor infill to shell support walls. Because the inner shell support wall is offset towards the inside of the object, the ends of infill paths touch it and can anchor to it.

In some implementations, the direction of the infill pattern is rotated to maximize how many infill lines are anchored on both ends, either to the object to be 3D printed, or to a wall support, and to minimize the run length. In some implementations, a known bridging algorithm can be used, but can be provided both the object toolpaths in the current slice and the wall support paths in the current slice for use as anchor points for bridging. In addition, in some implementations, more than one layer (e.g., three layers) of solid infill can be used above each overhang to provide a good platform on which traditional infill can be added in higher layers. Moreover, each additional layer of infill above the overhang can be deliberately rotated from the infill raster pattern in the layer there below in order to increase the strength of the resulting infill platform. This also helps ensure that the bottom side of the overhang is sealed off.

Any infill filaments that have a run from the object to support (or vice versa, or from support to support) that are shorter than max bridge length, need no further support. However, the infill may need additional support when the overhang is large since the filaments will sag as the maximum bridge distance is exceeded. Thus, creation 325 of the infill support path(s) can also include identifying locations along the infill toolpath that are farther from an anchor point than the max bridge distance, and joining the identified locations to create an infill support path in the current slice for the overhang infill path of the previous slice. In general, the infill toolpath(s) for the overhang can be traced to find any span that exceeds the max bridge length, flag points in such spans that need support, and then connect those points to make a support wall to hold up the infill of the overhang. Note that the resulting support wall may end up being an odd curved pattern that nonetheless never lets the infill span more than the maximum bridge distance, while using the minimum amount of support structure, and this support wall for the infill can then be processed for subsequent slices in the same manner as the support walls created for the object shells.

In some implementations, support for long infill runs can be created as follows. We first generate points on every line that need to be supported. Trace inward from each infill path. If the path is greater than max bridge length (mbl), but less than mbl*2, put a support point in the center of the path. If the path is greater than mbl*2, place a support point mbl from each end of the path. Then repeat the process for the span between these two points. Repeat until the distance is less than mbl or a point was placed in the center. Do this for every supported fill path.

Next, join the support points into paths. Starting with the points on one path, see if there is a support point on the adjacent path close to the support points on the current path. Any point closer than mbl/2, that can be connected without crossing the boundaries of the object gets connected. Iterate through every infill path with support points. The resulting connected paths define the fill support walls. And similar to the wall support for object shells, the fill support paths are assigned to the layer below the one they are supporting.

In some implementations, the process 300 also Z-bumps 330 the overhang portion of previous slice. This is done so that the FFF material cools slightly as it drops from the slightly higher position, thus reducing the strength of the bond between the object shell and the support wall underneath it. For example, for the perimeter toolpath over a support wall toolpath, a height of the perimeter toolpath can be adjusted upward from a specified height of the slice by cutting out the overhang portion of the perimeter toolpath, changing a beginning of the cutout portion to make a diagonal upward move above the specified height for the slice, changing an ending of the cutout portion of the perimeter to make a diagonal downward move back to the specified height for the slice, and rejoining the cutout portion to the perimeter toolpath.

Note that while any filament passing over support is raised a small distance in Z, paths above this should not be raised since the bond between those higher layers should not be weakened. For the Z-bumped filaments, the extruded plastic will fall down to the height of the support structure, which produces filaments in the same position they would be otherwise, but with a looser bond to the structure below, making removal easier. Because the support material for overhangs should be easy to remove, the toolpath is moved up in Z when passing over support, and back down in Z when passing over the object layer below. This creates trapezoidal shaped paths.

However, it should be noted that the infill filaments should have a good bond with their anchor points in order to achieve bridging during 3D printing. Thus, in some implementations, the overhang infill path(s) are not Z-bumped upward. Alternatively, the overhang infill path(s) can be Z-bumped upward along with all other toolpath(s) in the overhang, but then an additional Z-bump downward can be made at the anchor points. This can provide a strong enough bond for bridging, but also still be a bit higher than the regular height of the layer to reduce bonding to facilitate removal of the inner support wall after 3D printing.

For example, for all paths, the portion of the path in the overhang can be cut out. At the beginning of the cut path, a diagonal upward move is made, reaching a configured height by the time support structure is reached. At the end of the cut path, a similar downward diagonal move is made, reaching the layer position at the end. Then, this cut portion is rejoined to the rest of the path, and for infill, a diagonal downward move is made for ends of the path over supported anchor points, though not all the way down to the layer height, only down to a configured anchor height. Separately configured lift heights can be used for infill and shells.

At this point in the process 300, the wall support path(s) for the current slice (to support the shell(s) in the previous slice), any needed infill path(s) in the overhang for the previous slice, and any needed support path(s) for the current slice (to support the overhang infill in the previous slice) have been created. However, there may be additional support path(s) created for the previous slice that need to be extended down to the build platform or other base. Thus, one or more support paths from the previous slice are projected into and subtracted 335 from the current slice, i.e., higher support paths are projected into the current slice, and any portions of these projected support paths that overlap with or abut the object in the current slice are removed.

For example, to ensure that support walls projected down from the object being supported do not overrun the model being 3D printed, any paths projected from higher slices can be overlaid with the boundary of the object in the current slice. Any pieces that cross this boundary, plus an extra configurable margin, are then subtracted. This prevents support from overlapping the object. In addition, having a positive margin that is also less than the maximum bridge distance ensures that the support walls will not attach to sides of the object during 3D printing, but will still provide support for higher filaments that span this small gap between object and support wall.

Support paths (both support paths created 320, 325 for the current slice and support paths that are projected 335 into the current slice) are then connected 340 in the current slice. This can involve using one or more of various known algorithms to connect separate points (e.g., various known solutions to the travelling sales man problem in computer science), and these connections are made so that the support pieces in the 3D printed object are connected into as continuous of a piece as possible to make fewer structures to remove, thus making removal of the support structures easier and quicker. When connecting support paths (both created support paths and projected support paths) in the current slice, checks should be made to be sure no connections cross the boundaries of the object at this layer, and that no connections are longer than the max bridge length. The resulting connections join new support for the current slice to the previous support from the previous slice, and as this process is repeated for each slice in sequence, the result will be continuous, single filament thick walls which are connected with each other and extend to the print bed (or raft) and incorporate more pieces as they reach their layers.

Traditional, user specified infill can also be generated 345, as needed, in any remaining portions of current slice that need to be infilled. A check can be made 350 to see if additional layers of the model remain to be processed. If so, the process 300 continues for a next slice generation 305 and process 300 iteration. In addition, in some implementations, any support toolpaths in the current layer that overlie the 3D model in the next layer are Z-bumped 360. By adjusting upward a height of any portions of the connected support paths for the current slice that fall within a boundary of the 3D model for the next slice, the bond formed between the 3D printed object and any support structures resting on top of the object is weakened, thus making the support structures easier to remove.

This Z-bump can also be a configurable amount, and applying this height adjustment to any support that crosses the boundary of the object for the layer below, prevents the support from forming a strong bond to any part of the object it sits on. This helps to ensure that the support can be removed without causing substantial damage to the 3D printed object. After the Z-bump 360 of the support paths, the process 300 continues.

Once no more slices of the object remain, the process 300 finishes 370 generation of the toolpaths for the 3D printing, as needed. In some implementations, this involves adding any additional toolpaths needed to anchor the object to the platform. In some implementations, this involves adding one or more toolpaths to create a raft for the object. Other options are also possible for the completion of the toolpath generation process.

Figure 4:
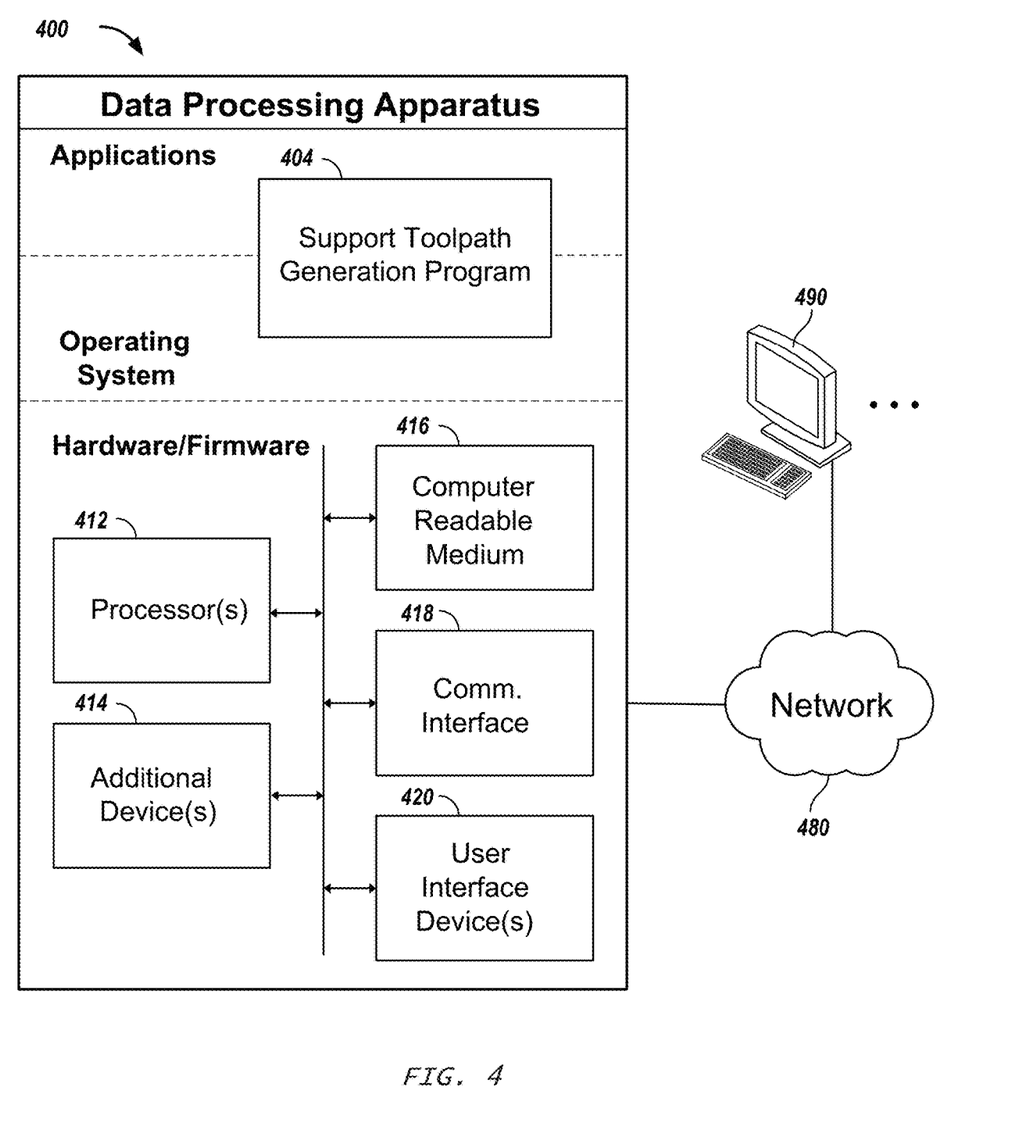
FIG. 4 is a schematic diagram of a data processing system, which can be used to implement the systems and techniques described herein.

FIG. 4 is a schematic diagram of a data processing system including a data processing apparatus 400, which can be programmed as a client or as a server. The data processing apparatus 400 is connected with one or more computers 490 through a network 480. While only one computer is shown in FIG. 4 as the data processing apparatus 400, multiple computers can be used. The data processing apparatus 400 includes various software modules, which can be distributed between an applications layer and an operating system. These can include executable and/or interpretable software programs or libraries, including tools and services of support toolpath generation program 404, such as described above. The number of software modules used can vary from one implementation to another. Moreover, the software modules can be distributed on one or more data processing apparatus connected by one or more computer networks or other suitable communication networks.

The data processing apparatus 400 also includes hardware or firmware devices including one or more processors 412, one or more additional devices 414, a computer readable medium 416, a communication interface 418, and one or more user interface devices 420. Each processor 412 is capable of processing instructions for execution within the data processing apparatus 400. In some implementations, the processor 412 is a single or multi-threaded processor. Each processor 412 is capable of processing instructions stored on the computer readable medium 416 or on a storage device such as one of the additional devices 414. The data processing apparatus 400 uses its communication interface 418 to communicate with one or more computers 490, for example, over a network 480. Thus, in various implementations, the processes described can be run in parallel or serially, on a single or multi-core computing machine, and/or on a cluster/cloud, etc.

Examples of user interface devices 420 include a display, a camera, a speaker, a microphone, a tactile feedback device, a keyboard, and a mouse. The data processing apparatus 400 can store instructions that implement operations associated with the modules described above, for example, on the computer readable medium 416 or one or more additional devices 414, for example, one or more of a floppy disk device, a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired network, a wireless network, or both. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A non-transitory computer-readable medium encoding instructions of a program operable to cause data processing apparatus to perform operations comprising:
    projecting a previous-layer support toolpath from a higher layer of a three dimensional (3D) model of a 3D object to be manufactured by a 3D extrusion printer into a current layer of the 3D model;
    removing any pieces of the projected previous-layer support toolpath that are within an expanded version of a current boundary of the 3D model in the current layer to create a projected current-layer support toolpath for the current layer;
    generating a new support toolpath for the current layer in accordance with the expanded version of the current boundary and a previous boundary of the 3D model in the higher layer;
    adding a predefined increase in height to one or more portions of one or more model toolpaths for the higher layer of the 3D model, where the one or more portions of the one or more model toolpaths overlie the new support toolpath generated for the current layer;
    connecting the new support toolpath and the projected current-layer support toolpath, without crossing the expanded version of the current boundary, to form a connected support toolpath;
    overlaying the connected support toolpath with a next boundary of the 3D model in a lower layer of the 3D model;
    adding a predefined increase in height to one or more portions of the connected support toolpath that falls within the next boundary of the 3D model in the lower layer of the 3D model; and
    repeating the projecting, the removing, the generating, the adding to the one or more portions of the one or more model toolpaths, the connecting, the overlaying, and the adding to the one or more portions of the connected support toolpath, through multiple layers of the 3D model to form support toolpaths for support walls for the 3D object to be manufactured by the 3D extrusion printer.

2. The non-transitory computer-readable medium of claim 1, wherein generating the new support toolpath for the current layer comprises:
    expanding a perimeter for the previous boundary by a fraction of a 3D print bead width for the 3D extrusion printer, the fraction being a positive number less than one;
    identifying at least one portion of the expanded perimeter that falls outside the expanded version of the current boundary; and
    using the at least one portion of the expanded perimeter to form the new support toolpath for the current layer.

3. The non-transitory computer-readable medium of claim 2, wherein the fraction of the 3D print bead width is a first configurable offset fraction, and generating the new support toolpath for the current layer comprises:
    contracting an innermost perimeter for the previous boundary by a second configurable offset fraction;
    identifying at least one portion of the contracted perimeter that falls outside the expanded version of the current boundary; and
    using the at least one portion of the contracted perimeter, in addition to the at least one portion of the expanded perimeter, to form the new support toolpath for the current layer.

4. The non-transitory computer-readable medium of claim 3, the operations comprising:
    creating an infill toolpath for the higher layer for an overhang portion of the 3D model inside the one or more portions of the one or more model toolpaths that overlie the new support toolpath, wherein the infill toolpath uses bridging between anchor points comprising anchors to a support wall to be 3D printed using an innermost part of the new support toolpath for the current layer;
    identifying locations along the infill toolpath that are farther from an anchor point than a maximum bridge distance; and
    joining the identified locations to create an infill support path, for the current layer, under the infill toolpath for the higher layer.

5. The non-transitory computer-readable medium of claim 4, the operations comprising:
    adding a first configurable height amount to the infill toolpath for the overhang portion; and
    subtracting a second configurable height amount from the infill toolpath at the anchor points.

6. The non-transitory computer-readable medium of claim 1, the operations comprising:
    creating an infill toolpath for the higher layer for an overhang portion of the 3D model inside the one or more portions of the one or more model toolpaths that overlie the new support toolpath, wherein the infill toolpath uses bridging between anchor points comprising anchors to a support wall to be 3D printed using an innermost part of the new support toolpath for the current layer;
identifying locations along the infill toolpath that are farther from an anchor point than a maximum bridge distance; and
joining the identified locations to create an infill support path, for the current layer, under the infill toolpath for the higher layer.

7. The non-transitory computer-readable medium of claim 6, wherein adding the predefined increase in height to the one or more portions of the one or more model toolpaths for the higher layer of the 3D model comprises:
cutting out the one or more portions of the one or more model toolpaths;
changing a beginning of the cutout portion to make a diagonal upward move;
changing an ending of the cutout portion to make a diagonal downward move; and
rejoining the cutout portion to the one or more model toolpaths.

8. The non-transitory computer-readable medium of claim 6, the operations comprising:
adding a height amount to the infill toolpath for the overhang portion; and
subtracting a height amount from the infill toolpath at the anchor points.

9. The non-transitory computer-readable medium of claim 8, wherein generating the new support toolpath for the current layer comprises:
expanding an outermost perimeter for the previous boundary by an offset fraction of a 3D print bead width for the 3D extrusion printer;
identifying at least one portion of the expanded perimeter that falls outside the expanded version of the current boundary;
contracting an innermost perimeter for the previous boundary by an offset fraction of the 3D print bead width for the 3D extrusion printer;
identifying at least one portion of the contracted perimeter that falls outside the expanded version of the current boundary; and
using the at least one portion of the expanded perimeter and the at least one portion of the contracted perimeter to form an outer perimeter support path and an inner perimeter support path, respectively, of the new support toolpath for the current layer.

10. The non-transitory computer-readable medium of claim 9, wherein generating the new support toolpath for the current layer comprises:
checking whether the inner perimeter support path fully contains the expanded version of the current boundary;
removing a piece of at least the inner perimeter support path when the inner perimeter support path fully contains the expanded version of the current boundary; and
removing any portions of the inner perimeter support path and the outer perimeter support path that overlap the current boundary when the inner perimeter support path does not fully contains the expanded version of the current boundary.

11. A method comprising:
projecting a previous-layer support toolpath from a higher layer of a three dimensional (3D) model of a 3D object to be manufactured by a 3D extrusion printer into a current layer of the 3D model;
removing any pieces of the projected previous-layer support toolpath that are within an expanded version of a current boundary of the 3D model in the current layer to create a projected current-layer support toolpath for the current layer;
generating a new support toolpath for the current layer in accordance with the expanded version of the current boundary and a previous boundary of the 3D model in the higher layer;
adding a predefined increase in height to one or more portions of one or more model toolpaths for the higher layer of the 3D model, where the one or more portions of the one or more model toolpaths overlie the new support toolpath generated for the current layer;
connecting the new support toolpath and the projected current-layer support toolpath, without crossing the expanded version of the current boundary, to form a connected support toolpath;
overlaying the connected support toolpath with a next boundary of the 3D model in a lower layer of the 3D model;
adding a predefined increase in height to one or more portions of the connected support toolpath that falls within the next boundary of the 3D model in the lower layer of the 3D model; and
repeating the projecting, the removing, the generating, the adding to the one or more portions of the one or more model toolpaths, the connecting, the overlaying, and the adding to the one or more portions of the connected support toolpath, through multiple layers of the 3D model to form support toolpaths for support walls for the 3D object to be manufactured by the 3D extrusion printer.

12. The method of claim 11, wherein generating the new support toolpath for the current layer comprises:
expanding a perimeter for the previous boundary by a fraction of a 3D print bead width for the 3D extrusion printer, the fraction being a positive number less than one;
identifying at least one portion of the expanded perimeter that falls outside the expanded version of the current boundary; and
using the at least one portion of the expanded perimeter to form the new support toolpath for the current layer.

13. The method of claim 12, wherein the fraction of the 3D print bead width is a first configurable offset fraction, and generating the new support toolpath for the current layer comprises:
contracting an innermost perimeter for the previous boundary by a second configurable offset fraction;
identifying at least one portion of the contracted perimeter that falls outside the expanded version of the current boundary; and
using the at least one portion of the contracted perimeter, in addition to the at least one portion of the expanded perimeter, to form the new support toolpath for the current layer.

14. The method of claim 13, the method comprising:
creating an infill toolpath for the higher layer for an overhang portion of the 3D model inside the one or more portions of the one or more model toolpaths that overlie the new support toolpath, wherein the infill toolpath uses bridging between anchor points comprising anchors to a support wall to be 3D printed using an innermost part of the new support toolpath for the current layer;
identifying locations along the infill toolpath that are farther from an anchor point than a maximum bridge distance; and joining the identified locations to create an infill support path, for the current layer, under the infill toolpath for the higher layer.

15. The method of claim 14, the method comprising:
adding a first configurable height amount to the infill toolpath for the overhang portion; and
subtracting a second configurable height amount from the infill toolpath at the anchor points.

16. The method of claim 11, the method comprising:
creating an infill toolpath for the higher layer for an overhang portion of the 3D model inside the one or more portions of the one or more model toolpaths that overlie the new support toolpath, wherein the infill toolpath uses bridging between anchor points comprising anchors to a support wall to be 3D printed using an innermost part of the new support toolpath for the current layer;
identifying locations along the infill toolpath that are farther from an anchor point than a maximum bridge distance; and
joining the identified locations to create an infill support path, for the current layer, under the infill toolpath for the higher layer.

17. The method of claim 16, wherein adding the predefined increase in height to the one or more portions of the one or more model toolpaths for the higher layer of the 3D model comprises:
cutting out the one or more portions of the one or more model toolpaths;
changing a beginning of the cutout portion to make a diagonal upward move;
changing an ending of the cutout portion to make a diagonal downward move; and
rejoining the cutout portion to the one or more model toolpaths.

18. The method of claim 16, the method comprising:
adding a height amount to the infill toolpath for the overhang portion; and
subtracting a height amount from the infill toolpath at the anchor points.

19. The method of claim 18, wherein generating the new support toolpath for the current layer comprises:
expanding an outermost perimeter for the previous boundary by an offset fraction of a 3D print bead width for the 3D extrusion printer;
identifying at least one portion of the expanded perimeter that falls outside the expanded version of the current boundary;
contracting an innermost perimeter for the previous boundary by an offset fraction of the 3D print bead width for the 3D extrusion printer;
identifying at least one portion of the contracted perimeter that falls outside the expanded version of the current boundary; and
using the at least one portion of the expanded perimeter and the at least one portion of the contracted perimeter to form an outer perimeter support path and an inner perimeter support path, respectively, of the new support toolpath for the current layer.

20. The method of claim 19, wherein generating the new support toolpath for the current layer comprises:
checking whether the inner perimeter support path fully contains the expanded version of the current boundary;
removing a piece of at least the inner perimeter support path when the inner perimeter support path fully contains the expanded version of the current boundary; and
removing any portions of the inner perimeter support path and the outer perimeter support path that overlap the current boundary when the inner perimeter support path does not fully contains the expanded version of the current boundary.

\* \* \* \* \*